US006765920B1

(12) United States Patent
Tari et al.

(10) Patent No.: US 6,765,920 B1
(45) Date of Patent: Jul. 20, 2004

(54) NETWORK ADDRESS CONVERTING APPARATUS AND STORAGE MEDIUM

(75) Inventors: Kazuyoshi Tari, Omiya (JP); Hiroyuki Unoki, Omiya (JP); Tumoru Nagira, Omiya (JP)

(73) Assignee: Mitsubishi Materials Corporation, Tokyo (JP)

(*) Notice: Subject to any disclaimer, the term of this patent is extended or adjusted under 35 U.S.C. 154(b) by 0 days.

(21) Appl. No.: 09/429,606

(22) Filed: Oct. 29, 1999

(30) Foreign Application Priority Data

Oct. 29, 1998 (JP) .......................................... 10-309230

(51) Int. Cl.⁷ .......................... H04L 12/28; H04L 12/56
(52) U.S. Cl. ....................... 370/401; 370/338; 370/402; 370/901; 370/331; 370/475; 370/352; 455/433; 709/245; 709/238; 709/239; 709/227; 709/228
(58) Field of Search ................................. 370/475, 466, 370/402, 338, 401, 901, 331, 352, 389; 709/245, 220, 221, 238, 230, 239, 202, 229, 227, 228; 455/432.1, 436, 433

(56) References Cited

U.S. PATENT DOCUMENTS

| 5,572,528 | A | * | 11/1996 | Shuen | 370/402 |
| 6,088,725 | A | * | 7/2000 | Kondo et al. | 709/220 |
| 6,137,791 | A | * | 10/2000 | Frid et al. | 370/352 |
| 6,144,671 | A | * | 11/2000 | Perinpanathan et al. | 370/409 |
| 6,160,804 | A | * | 12/2000 | Ahmed et al. | 370/349 |
| 6,195,705 | B1 | * | 2/2001 | Leung | 709/245 |
| 6,353,614 | B1 | * | 3/2002 | Borella et al. | 370/389 |
| 6,414,950 | B1 | * | 7/2002 | Rai et al. | 370/338 |
| 6,473,413 | B1 | * | 10/2002 | Chiou et al. | 370/331 |
| 6,487,605 | B1 | * | 11/2002 | Leung | 709/245 |
| 6,501,746 | B1 | * | 12/2002 | Leung | 370/338 |
| 6,546,425 | B1 | * | 4/2003 | Hanson et al. | 709/227 |

FOREIGN PATENT DOCUMENTS

| EP | 0 938 217 | 8/1999 |
| JP | 1-177232 | 7/1989 |
| JP | 8-181713 | 7/1996 |
| JP | 11-055317 | 2/1999 |
| JP | 11-088433 | 3/1999 |
| JP | 11-308273 | 11/1999 |

* cited by examiner

Primary Examiner—Wellington Chin
Assistant Examiner—Chuong Ho
(74) Attorney, Agent, or Firm—Oblon, Spivak, McClelland, Maier & Neustadt, P.C.

(57) ABSTRACT

A push-type information service to a client located within a local network and having only a local IP address becomes possible via a network address converting apparatus. A network address conversion program implementing the network address converting process may be stored on a storage medium. When assignment of an Internet IP address to a client is requested by a host server, an IP address assigning unit assigns an Internet IP address to that client. An address conversion table producing unit produces an address conversion table describing the correspondence between the Internet IP address assigned to the client and the local IP address of the client. An address converter notifies the host server of the assigned Internet IP address. After that, if the host server sends data to the acquired Internet IP address, the address converter converts the destination of the data to the corresponding local IP address of the client by referring to the address conversion table.

2 Claims, 6 Drawing Sheets

NETWORK ADDRESS CONVERTING APPARATUS AND STORAGE MEDIUM

BACKGROUND OF THE INVENTION

1. Field of the Invention

The present invention relates to a network address converting apparatus and a computer readable medium on which a network address conversion program is stored, whereby it becomes possible to provide push-type information service via the Internet to a client which is located within a local network and which has no Internet IP address.

2. Description of the Related Art

In general, a client connected to, for example, a local area network (LAN) is assigned an IP address defined in that LAN (hereinafter referred to as a local IP address). When this client communicates with a host server connected to, for example, the Internet (hereinafter referred to as an external host), it is required that the client use an Internet IP address assigned to the client in which Internet IP addresses are managed by Internet society.

When a client located within a LAN and having no Internet IP address gets access to an external host, the client requests, for example, a router having a network address translation (NAT) capability to assign an Internet IP address. The router selects one of the Internet IP addresses registered in advance and assigns the selected Internet IP address to the client.

In the case where data is transmitted from the client to the external host, the router having the NAT capability converts the local IP address of the client to the Internet IP address assigned to that client. On the other hand, when data addressed to the client is received from the external host, the router converts the IP address designating the destination (that is the Internet IP address assigned to the client) to the local address of the client. Thus, communication between the client within the LAN and the external host is achieved.

In recent years, push-type information service is provided in which information is sent from an external host to a particular client even when the client does not issue a request. However, the conventional technique does not allow clients within a LAN to receive pushtype information service.

This is because, for example, the router having the NAT capability can assign an Internet IP address to a client only when assignment is requested by the client and cannot assign an Internet IP address to a client within the LAN in response to an access request from an external host.

SUMMARY OF THE INVENTION

In view of the above, it is an object of the present invention to provide a network address converting apparatus and a computer readable storage medium on which a network address conversion program is stored, whereby an external host can provide push-type information service even to a client within a local network via the Internet.

It is another object of the present invention to provide a network address converting apparatus and a computer readable storage medium on which a network address conversion program is stored, whereby an external host can provide push-type information service to a client within a radio communication network including a plurality of subnetworks each including a server and a client connected to each other via radio communication wherein the client is movable among the plurality of subnetworks.

To achieve these and other objects, the present invention provides a network address converting apparatus for converting a source address or a destination address included in data transmitted between an external host server connected to the Internet and a client within a local network. The network address converting apparatus when an assignment request signal requesting assignment of an Internet IP address to a particular client within the local network is received from the external host server, the network address converting apparatus assigns an Internet IP address to the particular client and notifies the external host server of the assigned Internet IP address; and when data addressed to the assigned Internet IP address is received from the external host server, the network address converting apparatus converts the destination of the received data to the particular client's address defined in the local network.

The network address converting apparatus preferably includes: data analyzing means which receives data transmitted between the external host server and a client and analyzes the type, the destination, and the sender of the data; IP address assigning means which, if the data analyzing means determines that the received data is an Internet IP address assignment request signal sent from the external host server, selects one of a plurality of Internet IP addresses stored in advance in the IP address assigning means and assigns the selected Internet IP address to the client which is requested to be assigned an Internet IP address by the Internet IP address assignment request signal; address conversion table producing means which, each time said IP address assigning means assigns an Internet IP address to a client, stores in a relational fashion the Internet IP address assigned to said client and the client's address defined in said local network thereby producing an address conversion table; address conversion means which, each time the IP address assigning means assigns an Internet IP address to a client, sends the assigned Internet IP address to the sender of the Internet XP address assignment request signal, and which, if the data analyzing means determines that the received data is addressed to the Internet IP address assigned to the client, converts the Internet IP address designating the destination of the data to the corresponding address defined in the local network by referring to the address conversion table.

According to another aspect of the invention, there is provided a network address converting apparatus for converting a source address or a destination address included in data transmitted between an external host server connected to the Internet and a mobile terminal within a radio communication network system, the radio communication network system including a plurality of subnetworks each including at least one mobile terminal and at least one wireless server connected via radio communication to the at least one mobile terminal, the mobile terminal being movable among the plurality of subnetworks, each wireless server storing and managing the Internet IP address of a wireless server which controls a subnetwork in which one or more mobile terminals, for which the wireless server serves as the home server, are currently located, said network address converting apparatus being characterized in that: the network address converting apparatus is provided for each wireless server; and the network address converting apparatus operates in such a manner that: when an inquiry signal about the current location of a particular mobile terminal is sent from an external host server to a home server of the particular mobile terminal, if the network address converting apparatus receives the inquiry signal, it notifies the external host server of the Internet IP address of the wireless server which controls a subnetwork in which the particular mobile terminals is currently located; when an assignment request signal requesting assignment of an Internet IP address to the particular mobile terminal is received from the external host server, the network address converting apparatus assigns an Internet IP address to the particular mobile terminal and notifies the external host server of the assigned Internet IP address; and when data addressed to the assigned Internet IP address is received from the external host server, the network address converting apparatus converts the destination of the received data to the particular mobile terminals address defined in the subnetwork in which the particular mobile terminal is currently located.

Preferably, the network address converting apparatus includes: data analyzing means which receives data transmitted between the mobile terminal and the external host server connected to the Internet and analyzes the type, the destination, and the sender of the data; current location retrieving and notifying means which, if the data analyzing means determines that the received data is an inquiry signal about the current location of a particular mobile terminal sent from the external host server, searches the mobile terminals stored in the respective wireless servers and the Internet IP addresses of wireless servers controlling subnetworks in which the respective terminals are currently located so as to detect the Internet IP address of the wireless server which controls the subnetwork in which the particular mobile terminal is currently located, and sends the detected Internet IP address to the sender of the inquiry signal; IP address assigning means which, if the data analyzing means determines that the received data is an Internet IP address assignment request signal sent from the external host server, selects one of a plurality of Internet IP addresses stored in advance in the IP address assigning means and assigns the selected Internet IP address to the mobile terminal which is requested to be assigned an Internet IP address by the Internet IP address assignment request s signal; address conversion table producing means which, each time the IP address assigning means assigns an Internet IP address to a mobile terminal, stores in a relational fashion the Internet IP address assigned to the mobile terminal and the mobile terminals address defined in the subnetwork in which the mobile terminal is located; and an address converter which, each time the IP address assigning means assigns an Internet IP address to a mobile terminal, sends the assigned Internet IP address to the sender of the Internet IP address assignment request signal, and which, if the data analyzing means determines that the received data is addressed to the destination designated by the Internet IP address assigned to the mobile terminal, refers to the address conversion table and converts the Internet IP address designating the destination of the data to the corresponding address defined in the subnetwork.

According to another aspect of the invention, there is provided a computer readable storage medium storing a network address conversion program executed by a computer to convert a source address or a destination address included in data transmitted between an external host server connected to the Internet and a client within a local network, the network address conversion program including: a first step in which, when an assignment request signal requesting assignment of an Internet IP address of to particular client within the local network is received from the external host server, an Internet IP address is assigned to the particular client, and the assigned Internet IP address is sent to the external host server; and a second step in which, when data addressed to the Internet IP address assigned in the first step is received from said external host server, the network address converting apparatus converts the destination of the received data to said particular client's address defined in the local network.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

The present invention is described in further detail with reference to preferred embodiments in conjunction with the accompanying drawings.

First Embodiment

Figure 1:
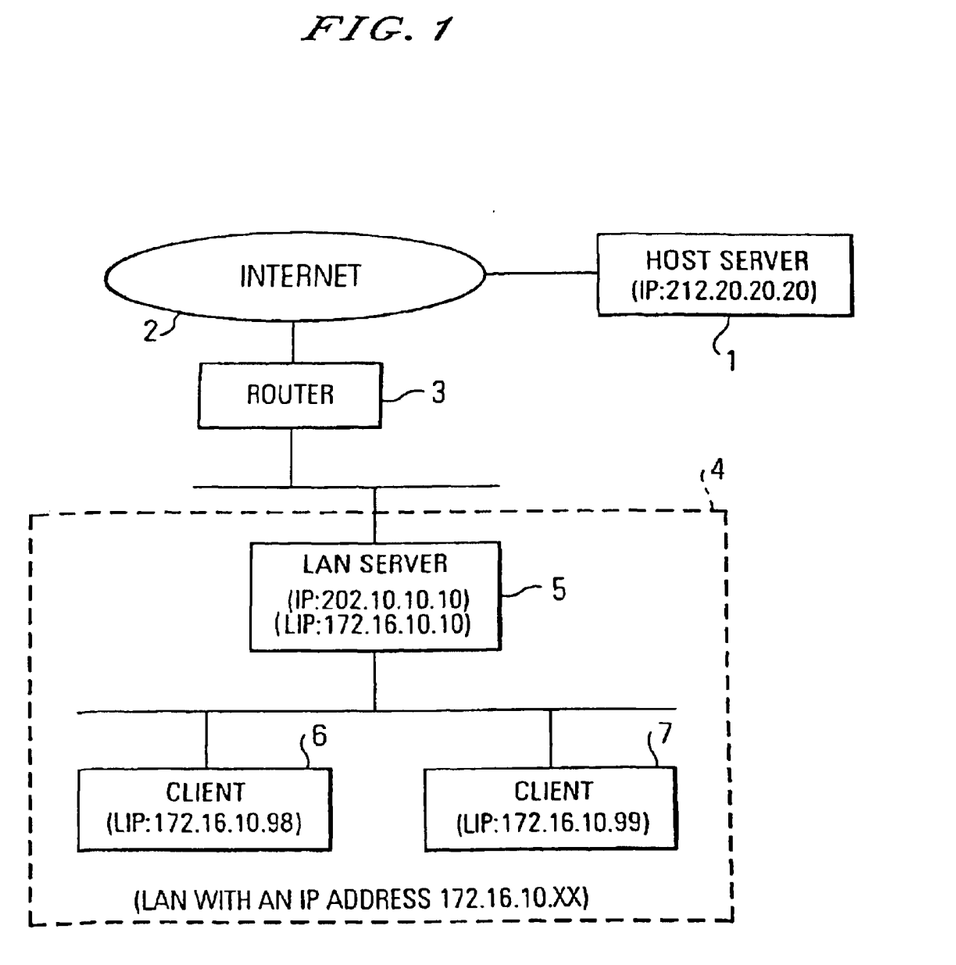
FIG. 1 is a block diagram illustrating the general construction of a communication network system including a network address converting apparatus according to a first embodiment of the invention.

FIG. 1 is a schematic diagram illustrating a communication network system including a network address converting apparatus according to a first embodiment of the invention. In FIG. 1, reference numeral 1 denotes a host server which provides push-type information service to particular clients via the Internet 2. This host server 1 has an Internet IP address "212.20.20.20" (the Internet IP address is represented simply as IP in FIG. 1, and also in other figures). Reference numeral 3 denotes a router for controlling the communication path such that data received via the Internet or a LAN which will be described later is transferred to a destination node.

Reference numeral 4 denotes a LAN. Each node of this LAN is assigned an IP address (local IP address) "172.16.X.X" (where X is a value uniquely assigned to each node). Reference numeral 5 denotes a server of the LAN 4 (hereinafter, referred to as a LAN server), which controls communication between clients in the LAN 4 and also controls communication via the Internet 2 between a client in the LAN 4 and a server of another network connected to the Internet 2.

The LAN server 5 includes a network address converting apparatus (which will be described in detail later) whereby push-type information service from the host server 1 to clients in the LAN 4 is achieved. The LAN server 5 has an Internet IP address "202.10.10.10" and also a local IP address (represented as LIP in FIG. 1 and other figures) "172-16.10.10".

Reference numerals 6 and 7 denote clients in the LAN 4. They only have local IP addresses, "172.16.10.98" and "172.16.10.99", respectively. Data transmitted via the communication network described above includes a header in which the Internet IP address or the local IP address indicating the destination and the sender are described.

Figure 2:
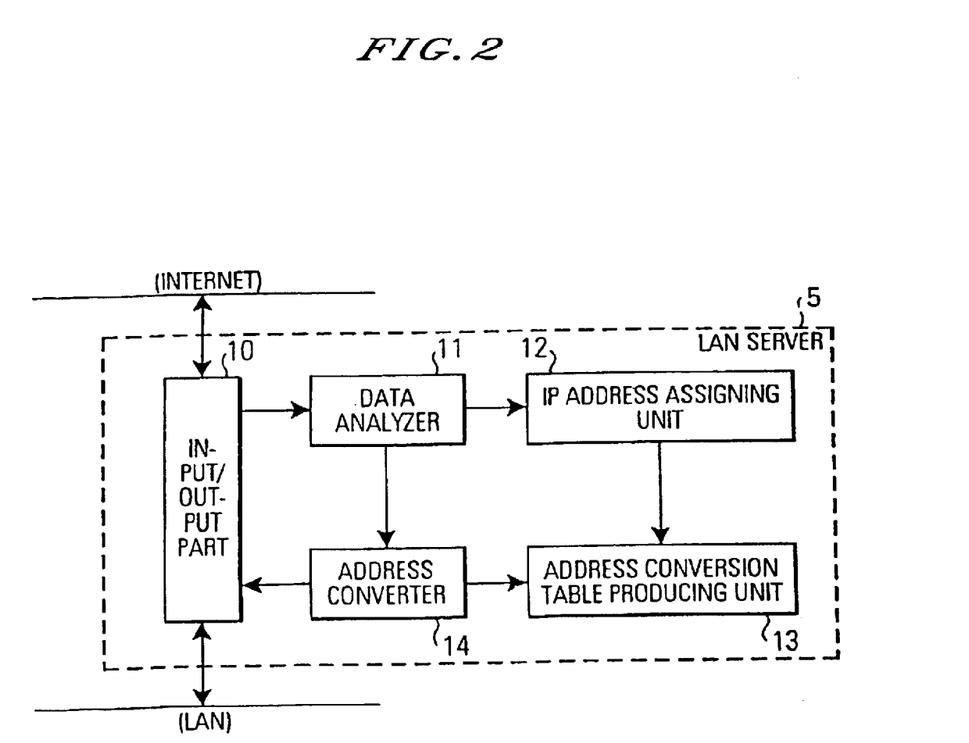
FIG. 2 is a block diagram illustrating the construction of the network address converting apparatus.

The construction of the network address converting apparatus included in the LAN server 5 is described below with reference to FIG. 2. In FIG. 2, reference numeral 10 denotes an input/output part which receives data from the Internet 2 or the LAN 4 and transfers it to the Internet 2 or the LAN 4 depending on the destination IP address described in the received data. A data analyzer 11 analyzes the sender, destination and content of the data received via the input/output part 10 and determines whether or not the received data is a destination Internet IP address assignment request signal (hereinafter referred to simply as an assignment request signal) from the Internet 2.

An assignment request signal is issued by an external host (the host server 1 in this specific example) which provides push-type information service to request a local network server (the LAN server 5 in this specific example) of a local network including a client to which information is to be supplied to assign an Internet IP address to that client. The assignment request signal includes at least (1) identification information indicating that the signal is an assignment request signal (hereinafter referred to as assignment request identification information), and (2) information (local IP address in this example) indicating the client (client 6 or 7 in this example) to which the external host is going to supply information.

The data analyzer 11 determines whether data received from the Internet 2 via the input/output part 10 includes assignment request information, thereby determining whether the received data is an assignment request signal.

An IP address assigning unit 12 stores in advance a plurality of Internet IP addresses given to the LAN 4. When the data analyzer 11 determines that an assignment request signal has been received, the IP address assigning unit 12 selects one Internet IP address which is not presently used from the plurality of Internet IP addresses and assigns it to the client requested to be assigned an Internet IP address.

An address conversion table producing unit 13 includes an address conversion table in which the local IP address of the client requested to be assigned an Internet IP address and the Internet IP address assigned to that client are described in a relational fashion. Each time the IP address assigning unit 12 assigns an Internet IP address to a client requested to be assigned an address, the address conversion table producing unit 13 adds, to the address conversion table, the local IP address of the client and the Internet IP address assigned to that client in such a manner as to represent the correspondence between the local IP address and the Internet IP address.

If, in response to an assignment request signal from an external host, new data representing the correspondence between a local IP address and an Internet IP address is added to the address conversion table of the address conversion table producing unit 13, an address converter 14 sends, via the input/output part 10, the Internet IP address assigned to the client requested to be assigned an Internet IP address to the external host which is the sender of the assignment request signal.

In the case where the data analyzer 11 has determined that data received via the input/output part 10 from the Internet 2 is not an assignment request signal, the address converter 14 refers to the address conversion table and converts the destination Internet IP address included in the data received from the external host to the corresponding local IP address of the client to which information is to be sent. The data received from the sender, that is the external host, is then transferred together with the Internet IP address of the external host to the client designated by the resultant local IP address.

Figure 3:
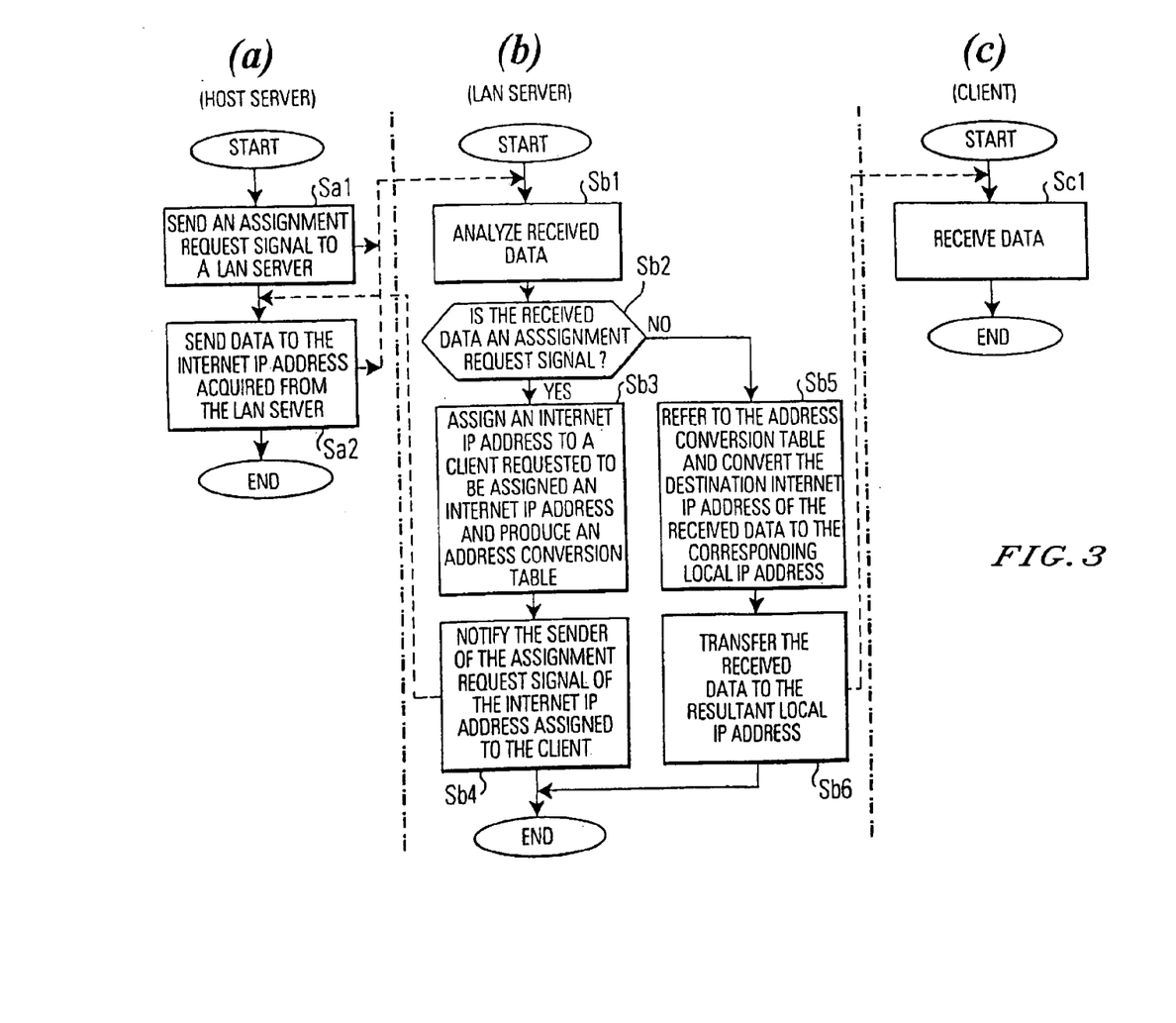
FIG. 3 is a flow chart illustrating the operations performed by various parts of the communication network system to provide push-type information service.

In the communication network system described above, the operation performed by the host server 1 shown in FIG. 1 to provide push-type information service to the client 6 is described with reference to the flow chart shown in FIG. 3. FIGS. 3(*a*)–3(*b*) are flow charts illustrating the operations of the host computer 1, the LAN server 5, and the client 6, respectively. In FIGS. 3(*a*)–3(*b*), broken-line arrows represent data flows.

In the case where the host server 1 supplies information to the client 6, the host server 1 transmits, in step Sa1 shown in FIG. 3(*a*), an assignment request signal to request the LAN 5 to assign an Internet IP address to the client 6. If the LAN server 5 receives the assignment request signal, the data analyzer 11 analyzes the received data in step Sb1 shown in FIG. 3(*b*).

The process then goes to step Sb2. If it is determined in step Sb2 that the received data is an assignment request signal, the process goes to step Sb3. On the other hand, if it is determined in step Sb2 that the received data is not an assignment request signal, the process goes to step Sb5. In this specific example, the LAN server 5 has received an assignment request signal, and thus the process goes to step Sb3.

In step Sb3, the IP address assigning unit 12 selects one Internet IP address which is not presently used from a plurality of Internet IP addresses stored in advance and assigns the selected Internet IP address to the client 6. In response, the address conversion table producing unit 13 stores, into the address conversion table, the local IP address of the client 6 and the Internet IP address assigned by the IP address assigning unit 12 in such a manner as to represent the correspondence between the local IP address and the Internet IP address.

After the address conversion table producing unit 13 has added, to the address conversion table, new data representing the correspondence between the local IP address and the Internet IP address, the process goes to step Sb4. In step Sb4, the address converter 14 sends the Internet IP address assigned to the client 6 to the host server 1 which sent the assignment request signal.

If the host server 1 receives the Internet IP address assigned to the client 6 from the LAN server 5, the process goes to step Sa2. In step Sa2, the host server 1 transmits data to the received Internet IP address so as to supply data to the client 6.

If the LAN server 5 receives this data, then in step Sb1 in FIG. 3(*b*) the data analyzer 11 analyzes the received data. In the subsequent step Sb2, the received data is determined not to be an assignment request signal, and thus the process goes to step Sb5.

In step Sb5, in accordance with the address conversion table of the address conversion table producing unit 13, the address converter 14 converts the source Internet IP address included in the received data analyzed by the data analyzer 11 to the corresponding local IP address of the client 6.

In the next step Sb6, the address converter 14 transfers the data received from the host server 1 to the resultant local IP address (i.e., the client 6 via the input/output part 10). Thus, in step Sc1 in FIG. 3(c), the client 6 receives the data supplied from the host server 1.

In the example described above, the host server 1 supplies information to the client 6. However, the client 6 and other clients controlled by the LAN server 5 may also receive information from the host server 1 in a similar manner.

Furthermore, in the communication network system described above, when an access request to an external host (host server having an IP address other than "172.16.X.X") is issued by the client 6 or 7, the network address converting apparatus in the LAN server 5 may perform a process similar to the conventional NAT process. In this case, when the data analyzer 11 analyzes data received from the client in the LAN via the input/output part 10, it determines, from the destination IP address and the source IP address included in the data, that the data is an access request to an external host computer.

In response the IP address assigning unit 12 assigns an Internet IP address to the client which has issued the access request, and the address conversion table producing unit 13 produces a corresponding address conversion table. The address converter 14 converts the source IP address included in the data transmitted from the client to the Internet IP address assigned by the IP address assigning unit 12. The resultant Internet IP address is sent to the host server requested to be accessed.

Subsequently, the address converter 14 refers to the address conversion table and converts the destination IP address of data transmitted from the host computer to the client into the local IP address of that client. On the other hand, when data is transmitted from the client to the host server, the address converter 14 converts the source IP address of the data to the assigned Internet IP address. Thus, it becomes possible for the client and the host server to communicate with each other.

In the first embodiment, as described above, if the server which controls the local network receives an assignment request signal from an external host, the server assigns an Internet IP address to a client to which the external host is going to supply information. The server then produces an address conversion table and notifies the external host of the assigned Internet IP address.

After that, the external host transmits data to the acquired Internet IP address. When the server receives the data from the external host, the server converts the destination Internet IP address included in the received data to the local IP address of the client by referring to the address conversion table and transfers the data received from the external host to the client. Thus, this technique makes it possible to provide push-type information service to a particular client which belongs to a local network and which has no Internet IP address.

Second Embodiment

Figure 4:
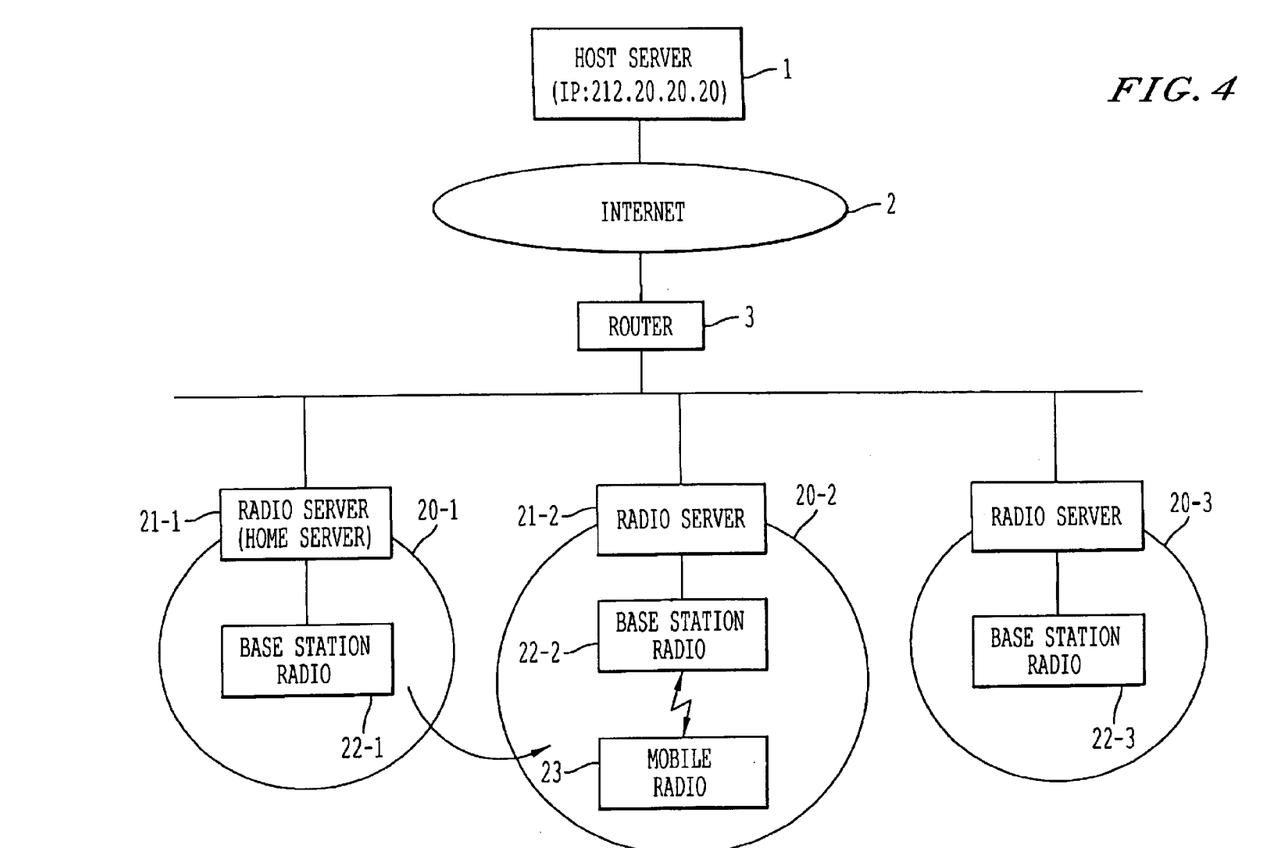
FIG. 4 is a block diagram illustrating a radio communication network system including a network address converting apparatus according to a second embodiment of the invention.
Figure 5:
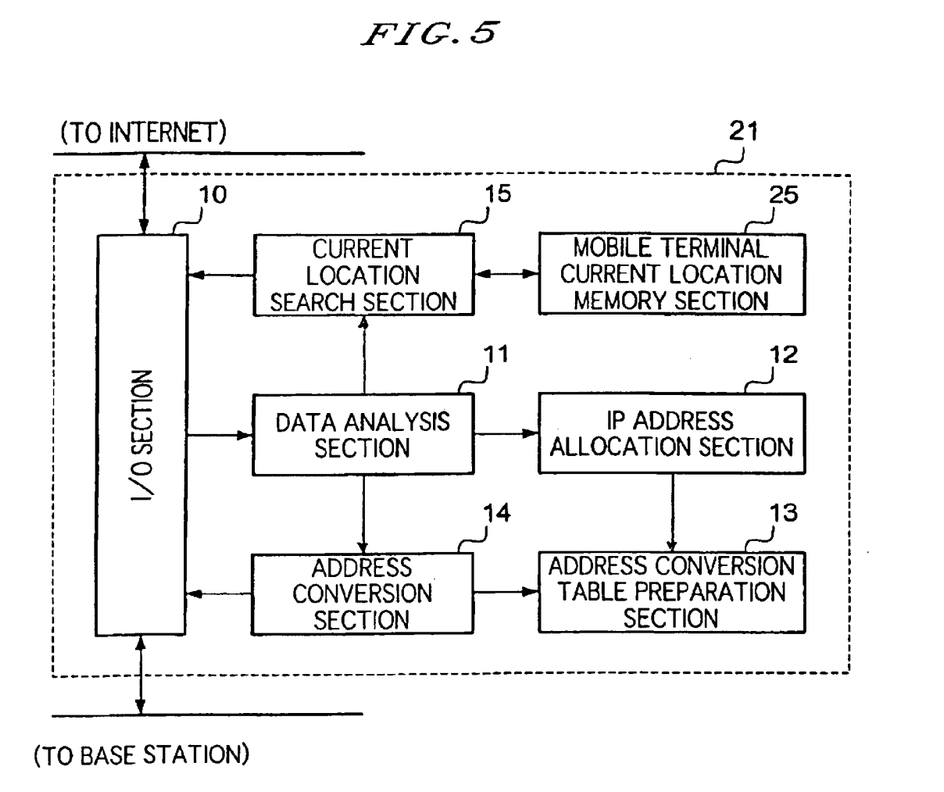
FIG. 5 is a block diagram illustrating the construction of the network address converting apparatus.

Referring to FIGS. 4 and 5, a second embodiment of a network address converting apparatus according to the present invention is described below. FIG. 4 is a schematic diagram illustrating a radio communication network system including the network address converting apparatus according to the second embodiment of the invention. In this figure, similar parts to those of the communication network system in FIG. 1 are denoted by similar reference numerals and they are not described here in further detail. The radio communication system shown in FIG. 4 is different from the communication system shown in FIG. 1 in the following respects.

Wireless servers 21-1 to 21-3 are connected to a router 3, and they control subnetworks 20-1 to 20-3, respectively. Each wireless server has its own Internet IP address and local IP address defined in the corresponding subnetwork under the control of that wireless server. Wireless base transceivers 22-1 to 22-3 are connected to the respective wireless servers 21-1 to 21-3. A plurality of wireless base transceivers may be connected to each wireless server, although in FIG. 4, only one wireless base transceiver is connected to each wireless server for simplicity of illustration.

A mobile terminal 23 is connected via radio communication to one of the wireless base transceivers 22-1 to 22-3 so as to communicate with a corresponding one of the wireless servers 21-1 to 21-3. There are a large number of mobile terminals in each subnetwork although only one mobile terminal 23 is shown in FIG. 4 for simplicity. Thus, in this case, mobile terminals located in the service areas of the respective wireless base transceivers are clients in the corresponding subnetworks.

Each mobile terminal belongs to a particular wireless server (hereinafter referred to as a home server). Each wireless server monitors the current location of each mobile terminal belonging to it. For example, when the wireless server 21-1 is the home server of the mobile terminal 23 shown in FIG. 4, if the mobile terminal 23 moves from the communication area of the wireless base transceiver 22-1 into the communication area of the wireless base transceiver 22-2, the mobile terminal 23 transmits its uniquely assigned identification number and the IP address of the home server (wireless server 21-1) to the wireless server 21-2 via the wireless base transceiver 22-2 for authentication and registration.

In the authentication and registration process, the wireless server 21-2 selects one of IP addresses available in the subnetwork 20-2 which is under the control of the wireless server 21-2 and assigns it to the mobile terminal 23. The selected IP address is sent to the mobile terminal 23.

The wireless server 21-2 determines whether the identification number received during the authentication and registration process is the identification number of a mobile terminal belonging to the wireless server 21-2. If it is determined that the mobile terminal does not belong to the wireless server 21-2, the wireless server 21-2 transmits the identification number of the mobile terminal 23 to the destination designated by the IP address (detected during the authentication and registration process) of the home server (the wireless server 21-1 in this example) of the mobile terminal 23 via the Internet 2.

If the wireless server 21-1 receives this identification number, the wireless server 21-1 stores the received identification number and the IP address of the wireless server 21-2 in relation to each other. In this way, the current location (the communication area of the wireless base transceiver 22-2 in this example) of the mobile terminal 23 is detected. Similarly, the current locations of all mobile terminals belonging to a wireless server can be detected, if the identification numbers of all mobile terminals belonging to the respective wireless servers serving as home servers and the Internet IP addresses of wireless servers which control subnetworks in which the respective mobile terminals are currently located are stored in a relational fashion in current mobile terminal location memories provided in the, respective wireless servers.

Referring to FIG. 5, the construction of a network address converter provided in each wireless server 21-1 to 21-3 is described below. In FIG. 5, similar parts to those of the network address converting apparatus shown in FIG. 2 are denoted by similar reference numerals and they are not described here in further detail. The network address converting apparatus of the present embodiment is different from that shown in FIG. 2 in that the data analyzer 11' determines not only whether received data is an assignment request signal, but also whether the received data is an inquiry signal about the current location of a mobile terminal (the data analyzer of the present embodiment is denoted by 11', to distinguish the difference).

To make an inquiry about the current location of that mobile terminal, a current location inquiry signal is output by the host server 1 to the home server of a mobile terminal to which the host server 1 is going to supply information. The current location inquiry signal includes at least: (1) identification information indicating that the signal is a current location inquiry signal (hereinafter referred to as inquiry identification information), and (2) the identification number (uniquely assigned to each mobile terminal, and different from the IP address) of the mobile terminal to which information is to be supplied.

The network address converting apparatus of the present embodiment includes a current location retrieving unit 15. When the data analyzer 11', determines that the received data is a current mobile terminal location inquiry signal, the current location retrieving unit 15 searches a current mobile terminal location memory 25 in accordance with the identification number included in the current location inquiry signal so as to detect the Internet IP address corresponding to the identification number. The detected Internet IP address is sent via the input/output part 10 to the host server which issued the current location inquiry signal.

Figure 6:
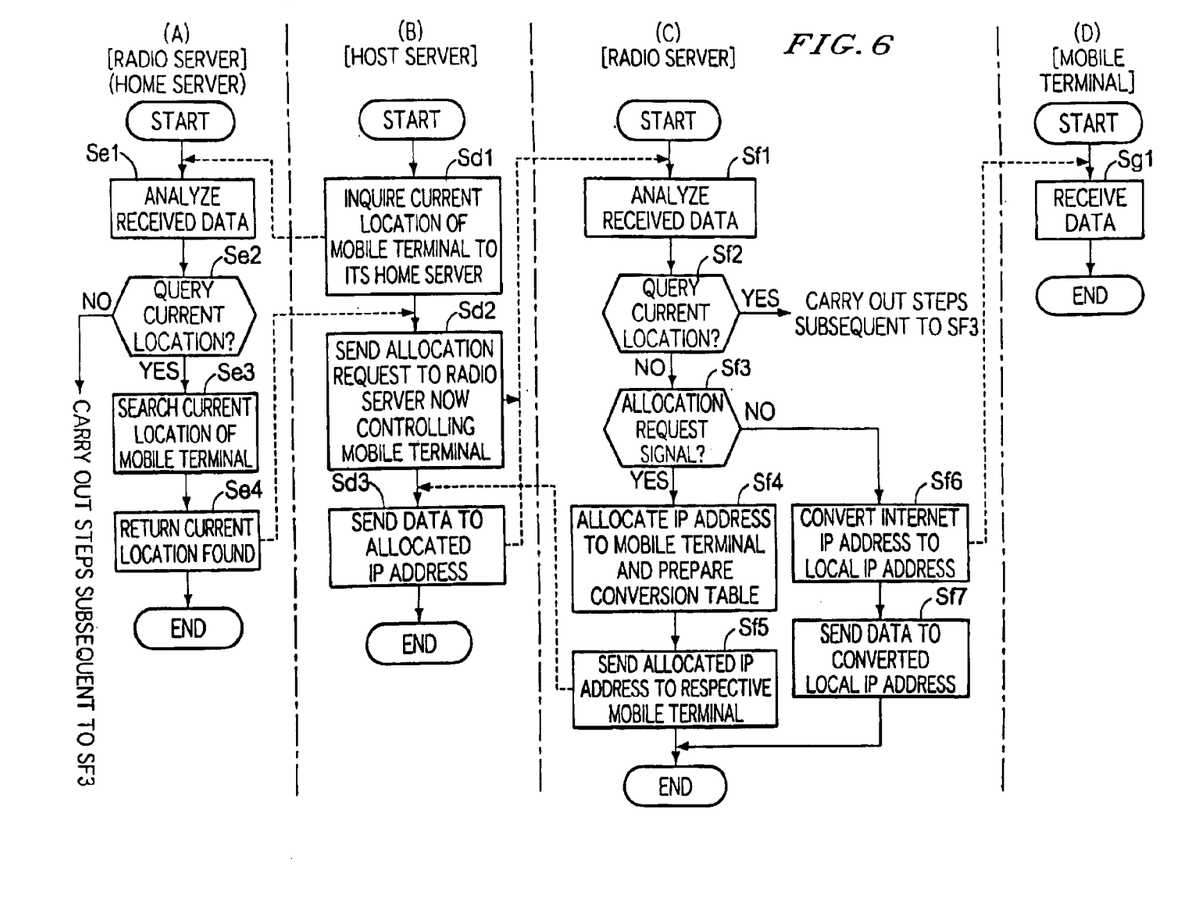
FIG. 6 is a flow chart illustrating the operations performed by various parts of the radio communication network system to provide push-type information service.

Referring to the flow chart shown in FIG. 6, the operations of various parts in the radio communication network system are described below for the case where the host server 1 connected to the Internet 2 provides push-type information service to the mobile terminal 23 shown in FIG. 4. The operation of the wireless server 21-1 serving as the home server of the mobile terminal 23 is shown in the flow chart of FIG. 6(a). Similarly, the operations of the host server 1, the wireless server 21-2 and the mobile terminal 23 are shown in the flow charts of FIGS. 6(b), 6(c), and 6(d), respectively. In these flow charts, broken-line arrows denote various data flows.

When the host server 1 supplies information to the mobile terminal 23, the host server 1 outputs, in step Sd1 in FIG. 6(b), a current location inquiry signal to the wireless server 21-1 serving as the home server of the mobile terminal 23. In response, in step Se1 in FIG. 6(a), the data analyzer 11' of the wireless server 21-1 analyzes the received data.

In the next step Se2, it is determined whether or not the received data is a current location inquiry signal. If it is determined that the received data is a current location inquiry signal, that is, if the result of the decision step Se2 is "Yes," the process goes to step Se3. In this specific example, the wireless server 21-1 has received a current location inquiry signal, and thus the result in step Se2 is "Yes", and the process goes to step Se3. The operation performed when it is determined in step Se2 that the received data is not a current location inquiry signal will be described later.

In step Se3, the current location retrieving unit 15 searches the current mobile terminal location memory 25 in accordance with the identification number included in the current location inquiry signal. In step Se4, the current location retrieving unit 15 detects the Internet IP address (the Internet IP address of the wireless server 21-2 in this specific example) corresponding to the identification number included in the current location inquiry signal and sends the detected Internet IP address to the host server 1.

Then in step Sd2 of FIG. 6(b), the host server 1 transmits an assignment request signal to the wireless server 21-2, controlling the subnetwork 20-2 in which the mobile terminal 23 is currently located, to assign an Internet IP address to the mobile terminal 23. If the wireless server 21-2 receives the assignment request signal, the data analyzer 11', analyzes the received data in step Sf1 shown in FIG. 6(c).

The process then goes to step Sf2 to determine whether the received data is a current location inquiry signal, and if yes, then step Se3 and the following steps are performed as described above. If the result of decision step Sf2 is "No," that is, if it is determined in step Sf2 that the received data is not a current location inquiry signal, then the process goes to step Sf3.

The operations performed by the wireless servers 21-1 to 21-3 are similar to each other. For example, steps Se1 and Se2 shown in FIG. 6(a) are the same as steps Sf1 and Sf2 shown in FIG. 6(c). Therefore, when the wireless server 21-2 makes a decision in step Sf2 shown in FIG. 6(c) in the affirmative, step Se3 and the following steps shown in FIG. 6(a) are performed. On the other hand, in the wireless server 21-1, if the decision in step Se2 shown in FIG. 6(a) is negative, step Sf3 and the following steps are performed as will be described below.

That is, when it is determined in step Sf2 that the received data is not a current location inquiry signal, the process goes to step Sf3 to further determine whether the received data is an assignment request signal. If Yes, that is, if the received data is an assignment request signal, then the process goes to step Sf4. On the other hand, if it is determined in step Sf3 that the received data is not an assignment request signal, the process goes to step Sf6. In this specific example, because the wireless server 21-2 has received an assignment request signal, the process goes to step Sf4.

In step Sf4, the IP address assigning unit 12 selects one Internet IP address which is not currently used from a plurality of Internet IP addresses stored in advance and assigns the selected Internet IP address to the mobile terminal 26. In response, the address conversion table producing unit 13 stores, into the address conversion table, the IP address of the mobile terminal 23 and the Internet IP address assigned by the IP address assigning unit 12 in relation to each other.

After the address conversion table producing unit 13 has added, to the address conversion table, new data representing the correspondence between the local IP address and the Internet IP address, the process goes to step Sf5, and the address converter 14 sends the Internet IP address assigned to the mobile terminal 23 to the host server 1 which sent the assignment request signal.

If the host server 1 receives the Internet IP address assigned to the mobile terminal 23 6 from the wireless server 21-2, then, in the next step Sd3 shown in FIG. 6(a), the host server 1 sends data to the received Internet IP address to supply the data to the mobile terminal 23.

If the wireless server 21-2 receives this data, the data analyzer 11, analyzes the received data in step Sf1 shown in FIG. 6(c). In this specific case, the data received by the wireless server 21-2 is neither a current location inquiry signal nor an assignment request signal, and thus both steps Sf2 and Sf3 make a negative decision.

Then in step Sf6, in accordance with the address conversion table of the address conversion table producing unit 13, the address converter 14 converts the destination Internet IP address included in the received data analyzed by the data analyzer 11',to the corresponding IP address of the mobile terminal 23.

In the next step Sf7, the address converter 14 transfers the data received from the host server 1 to the resultant local IP address, that is, the mobile terminal 23 via the input/output part 10 and the wireless base transceiver 22-2. Thus, in step Sg1 in FIG. 6(d), the mobile terminal 23 receives the data supplied from the host server 1. In the case where the mobile terminal 23 has moved from the communication area of the wireless base transceiver 22-2 into the communication area of the wireless base transceiver 22-3, the wireless server 21-1 can detect the new location of the mobile terminal 23 when the mobile terminal 23 performs an authentication and registration operation. The wireless server 21-3 which controls the subnetwork 20-3 may perform the process shown in FIG. 6(c), and thus the push-type information service to the mobile terminal 23 may be continued.

In the case where the mobile terminal 23 is located in the subnetwork 20-1 under the control of the wireless server 21-1 (home server of the mobile terminal 23). Steps Se1 and Se2 shown in FIG. 6(a) are performed in the wireless server 21-1 and then step Sf3 and the following steps shown in FIG. 6(c) are performed. Thus, also in this case, the host server 1 can provide the push-type information service to the mobile terminal 23.

The network address converting apparatus constructed in the manner described above with reference to FIG. 2 or 5 may be provided separately outside the LAN server 5 or the wireless servers 21-1 to 21-3, thereby achieving the functions of the network address converting apparatus described in the first or second embodiment.

A program implementing the process described above with reference to FIG. 3(b) or FIG. 6(a) or 6(c) may be stored on a computer readable storage medium. The program may be loaded from the storage medium onto a computer system and may be executed so as to perform the network address conversion process.

Herein the "computer system" may include an operating system and hardware, such as a peripheral device. The "computer readable storage medium" is used herein to refer to a wide variety of storage media. They include a removable/portable medium, such as a floppy disks, a magneto-optical disk, a ROM, a CD-ROM, etc., and a storage device such as a hard disk installed in a computer system. Furthermore, the "computer readable storage medium" also includes a medium which dynamically stores a program for a short time, such as an Internet network, a telephone line, and other communication lines, via which a program is transmitted. In this case, a storage medium such as a volatile memory which is installed in a computer system serving as a server or a client and which stores a program for a certain period of time is also a "computer readable storage medium."

The "program" may be a program which implements some part of the functions described above. Furthermore, the "program" may be such a program which is combined with a program which has been already installed on a computer system to implement the functions described above.

Furthermore, in the computer readable storage medium on which the network address conversion program for converting the destination address of received data is stored, the network address conversion program may include the steps of:

receiving data transmitted between an external host server and a client and analyzing the type, the destination, and the sender of the data;

selecting one of a plurality of Internet IP addresses stored in advance and assigning the selected Internet IP address to the client which is requested to be assigned an Internet IP address by the Internet IP address assignment request signal if it is determined in the data analyzing step that the received data is an Internet IP address assignment request signal sent from the external host server;

storing in a relational fashion the Internet IP address assigned to the client and the client's address defined in the local network thereby producing an address conversion table each time an Internet IP address is assigned to the client; and each time the Internet IP address is assigned to the client, converting the Internet IP address designating the destination of the data to the corresponding address defined in the local network by referring to the address conversion table, sending the assigned Internet IP address to the sender of the Internet IP address assignment request signal, and if it is determined in the analyzing step that the received data is addressed to the Internet IP address assigned to the client.

The network address conversion program may be a program for converting a source address or a destination address included in data transmitted between an external host server connected to the Internet and a mobile terminal within a radio communication network system.

In addition, the radio communication network system includes a plurality of subnetworks each including at least one mobile terminal and at least one wireless server connected via radio communication to the at least one mobile terminal. Further, the mobile terminal is movable among the plurality of subnetworks, and each wireless server stores and manages the Internet IP address of a wireless server which controls a subnetwork in which one or more mobile terminals, for which the wireless server serves as the home server, are currently locate.

The network address conversion program includes the steps of:

notifying the external host server of the Internet IP address of the wireless server which controls a subnetwork in which the particular mobile terminals is currently located if an inquiry signal about the current location of a particular mobile terminal sent from an external host server to a home server of the particular mobile terminal is received;

assigning an Internet IP address to the particular mobile terminal and notifying the external host server of the assigned Internet IP address when an assignment request signal requesting assignment of an Internet IP address to the particular mobile terminal is received from the external host server; and converting the destination of the received data to the particular mobile terminals address defined in the subnetwork in which the particular mobile terminal is currently located when data addressed to the assigned Internet IP address is received from the external host server.

The network address conversion program may also include the steps of:

receiving data transmitted between a mobile terminal and an external host server connected to the Internet and analyzing the type, the destination, and the sender of the data;

searching the mobile terminals stored in the respective wireless servers and the Internet IP addresses of wireless servers controlling subnetworks in which the respective terminals are currently located so as to detect the Internet IP address of the wireless server which controls the subnetwork in which the particular mobile terminal is currently located and sending the detected Internet IP address to the sender of the inquiry signal, if it is determined in the analyzing step that the received data is an inquiry signal about the current location of a particular mobile terminal sent from the external host server;

selecting one of a plurality of Internet IP addresses stored in advance and assigning the selected Internet IP address to the mobile terminal which is requested to be assigned an Internet IP address by the Internet IP address assignment request signal if it is determined in the analyzing step that the received data is an Internet IP address assignment request signal sent from the external host server;

storing in a relational fashion the Internet IP address assigned to the mobile terminal and the mobile terminals address defined in the subnetwork in which the mobile terminal is located each time an Internet IP address is assigned to a mobile terminal; and each time an Internet IP address is assigned to the mobile terminal, sending the assigned Internet IP address to the sender of the Internet IP address assignment request signal, and, if it is determined in the analyzing step that the received data is addressed to the destination designated by the Internet IP address assigned to the mobile terminal, referring to the address conversion table and converting the Internet IP address designating the destination of the data to the corresponding address defined in the subnetwork.

As described above, the present invention has great advantages. That is, in the present invention, in response to an assignment request signal from an external host, a server which controls a local network assigns an Internet IP address to a client to which the external host wants to supply information, and produces an address conversion table. The external host is notified of the Internet IP address assigned to the client. The external host sends data to the destination designated by the acquired Internet IP address. In the server, the destination Internet IP address included in the received data is converted to the corresponding local IP address of the client by referring to the address conversion table. The data received from the external host is then transferred to the client designated by the local IP address. Thus, it is possible to provide push-type information service to the particular client located within the local network and having no Internet IP address.

Furthermore, in a radio communication network system including a plurality of subnetworks each including at least one mobile terminal and wireless server connected to each other via radio communication (the mobile terminal being movable among the plurality of subnetworks), each wireless server storing and managing the Internet IP address of a wireless server which controls a subnetwork in which one or more mobile terminals, for which the wireless server serves as the home server, are currently located, communication between a mobile terminal within a subnetwork under the control of a wireless server is controlled such that the external host server is notified of the Internet IP address of the wireless server which controls a subnetwork in which the particular mobile terminals is currently located when an inquiry signal about the current location of a particular mobile terminal sent from an external host server to a home server of a particular mobile terminal is received.

In addition, an Internet IP address is assigned to the particular mobile terminal, and the external host server is notified of the assigned Internet IP address when an assignment request signal requesting assignment of an Internet IP address to the particular mobile terminal is received from the external host server, thereby making it possible to provide push-type information service to a client of the radio communication network in which the client is connected to a server via radio communication and is allowed to move among the plurality of subnetworks.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CM-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A network address converting apparatus for converting a source address or a destination address included in data transmitted between an external host server connected to the Internet and a mobile terminal within a radio communication network system, the radio communication network system including a plurality of subnetworks, each including at least one mobile terminal and at least one wireless server connected via radio communication to the at least one mobile terminal, the mobile terminal being movable among the plurality of subnetworks, each wireless server storing and managing the Internet IP address of a wireless server which controls a subnetwork in which one or more mobile terminals, for which the wireless server serves as the home server, are currently located, wherein:

the network address converting apparatus is provided for each wireless server; and the network address converting apparatus operates in such a manner that:

when an inquiry signal about the current location of a particular mobile terminal is sent from an external host server to a home server of the particular mobile terminal, if the network address converting apparatus receives the inquiry signal, it notifies the external host server of the Internet IP address of the wireless server which controls a subnetwork in which the particular mobile terminals is currently located;

when an assignment request signal requesting assignment of an Internet IP address to the particular mobile terminal is received from the external host server, the network address converting apparatus selects one of available IP addresses in a subnetwork including the network address converting apparatus and assigns the selected Internet IP address to the particular mobile terminal and notifies the external host server of the assigned Internet IP address; and when data addressed to the assigned Internet IP address is received from the external host server, the network address converting apparatus converts the destination of the received data to an address of the particular mobile terminal defined in the subnetwork in which the particular mobile terminal is currently located.

2. A network address converting apparatus according to claim 1, comprising:

a data analyzing mechanism configured to receive data transmitted between the mobile terminal and the external host server connected to the Internet, and configured to analyze a type, a destination, and a sender of the data;

a current location retrieving and notifying mechanism which, if the data analyzing mechanism determines that the received data is an inquiry signal about the current location of a particular mobile terminal sent from the external host server, searches the mobile terminals stored in the respective wireless servers and the Internet IP addresses of wireless servers controlling subnetworks in which the respective terminals are currently located so as to detect the Internet IP address of the wireless server which controls the subnetwork in which the particular mobile terminal is currently located, and sends the detected Internet IP address to the sender of the inquiry signal;

an IP address assigning unit which, if the data analyzing mechanism determines that the received data is an Internet IP address assignment request signal sent from the external host server, selects one of a plurality of Internet IP addresses stored in advance in the IP address assigning unit and assigns the selected Internet IP address to the mobile terminal which is requested to be assigned an Internet IP address by the Internet IP address assignment request signal;

an address conversion table producing unit which, each time the IP address assigning unit assigns an Internet IP address to a mobile terminal, stores in a relational fashion the Internet IP address assigned to the mobile terminal and the mobile terminals address defined in the subnetwork in which the mobile terminal is located; and an address converter which, each time the IP address assigning unit assigns an Internet IP address to a mobile terminal sends the assigned Internet IP address to the sender of the Internet IP address assignment request signal, and which, if the data analyzing mechanism determines that the received data is addressed to the destination designated by the Internet IP address assigned to the mobile terminal, refers to the address conversion table and converts the Internet IP address designating the destination of the data to the corresponding address defined in the subnetwork.

* * * * *